US011265279B2

(12) United States Patent
Willis et al.

(10) Patent No.: US 11,265,279 B2
(45) Date of Patent: Mar. 1, 2022

(54) ENHANCING MESSAGES WITH DYNAMIC CONTENT

(71) Applicant: DIREQT, INC., Seattle, WA (US)

(72) Inventors: Michael John Willis, Redmond, WA (US); William Warren Madden, Delray Beach, FL (US)

(73) Assignee: DIREQT, INC., Seattle, WA (US)

( * ) Notice: Subject to any disclaimer, the term of this patent is extended or adjusted under 35 U.S.C. 154(b) by 0 days.

(21) Appl. No.: 17/161,082

(22) Filed: Jan. 28, 2021

(65) Prior Publication Data

US 2021/0152508 A1  May 20, 2021

Related U.S. Application Data

(63) Continuation of application No. PCT/US2020/052064, filed on Sep. 22, 2020.

(60) Provisional application No. 62/904,546, filed on Sep. 23, 2019.

(51) Int. Cl.
*H04L 12/58* (2006.01)
*G06Q 30/02* (2012.01)
*H04L 51/18* (2022.01)
*H04L 51/02* (2022.01)

(52) U.S. Cl.
CPC ......... *H04L 51/18* (2013.01); *G06Q 30/0251* (2013.01); *H04L 51/02* (2013.01)

(58) Field of Classification Search
CPC ...... H04L 51/18; H04L 51/02; G06Q 30/0251
See application file for complete search history.

(56) References Cited

U.S. PATENT DOCUMENTS

| 9,634,968 | B1* | 4/2017 | Stark | H04L 51/046 |
| 2004/0015398 | A1* | 1/2004 | Hayward | G06F 40/103 |
| | | | | 705/14.49 |
| 2007/0104193 | A1* | 5/2007 | Choi | H04L 67/125 |
| | | | | 370/389 |
| 2012/0084349 | A1* | 4/2012 | Lee | G06Q 30/0251 |
| | | | | 709/203 |
| 2013/0145222 | A1* | 6/2013 | Birdsall | G06F 9/542 |
| | | | | 714/48 |
| 2015/0271111 | A1* | 9/2015 | Dowdell | H04L 51/04 |
| | | | | 709/206 |
| 2017/0250930 | A1 | 8/2017 | Ben-Itzhak | |

FOREIGN PATENT DOCUMENTS

| GB | 2 455 736 A | 6/2009 |
| WO | WO-2010/015071 A1 | 2/2010 |

OTHER PUBLICATIONS

International Search Report and Written Opinion for PCT Appl. No. PCT/US2020/052064 dated Dec. 9, 2020.

* cited by examiner

*Primary Examiner* — John A Follansbee
*Assistant Examiner* — Raqiul A Choudhury
(74) *Attorney, Agent, or Firm* — Foley & Lardner LLP

(57) ABSTRACT

A method for augmenting message streams may comprise receiving a request for augmentation of a message, the request including a parameter associated with the message. The method may further include determining a rule associated with the message. The method may further include applying the determined rule to the message parameters to select an augmentation component. The method may further include transmitting an augmented message to the requestor, the augmented message including the augmentation component.

20 Claims, 12 Drawing Sheets

FIG. 7
700
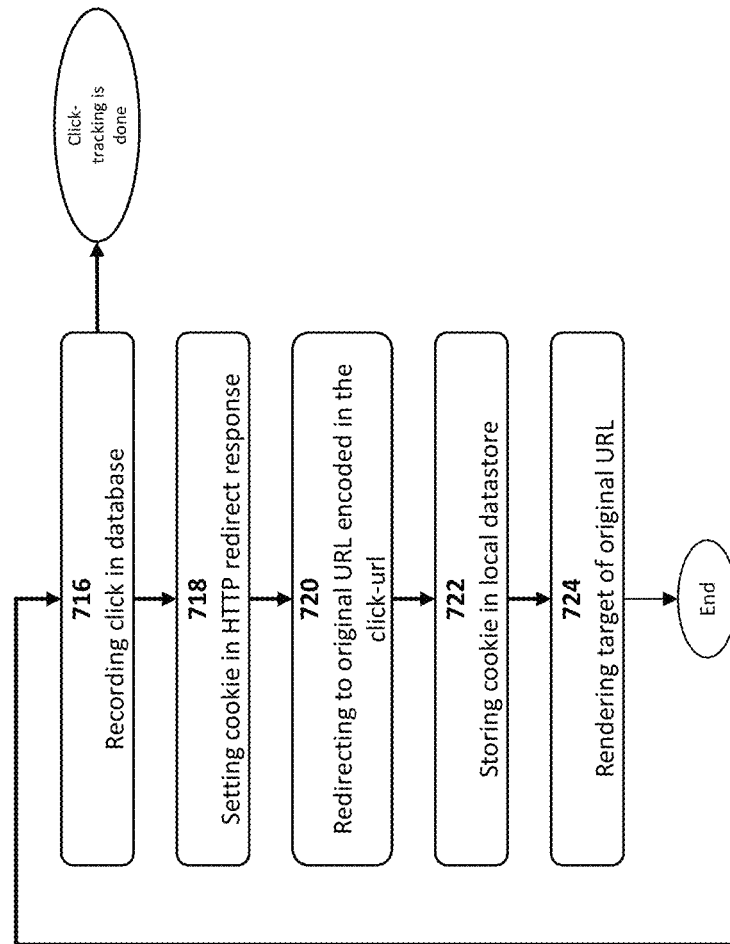
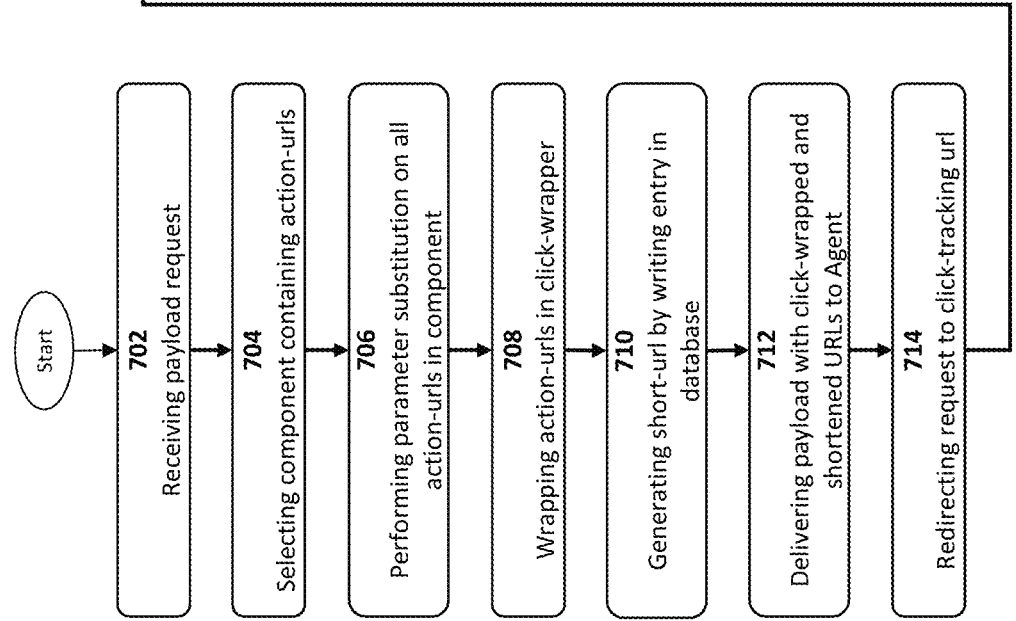

1000

1100

FIG. 12
1200
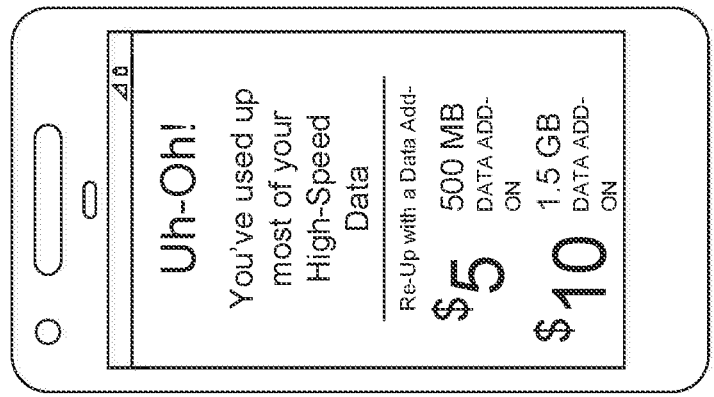
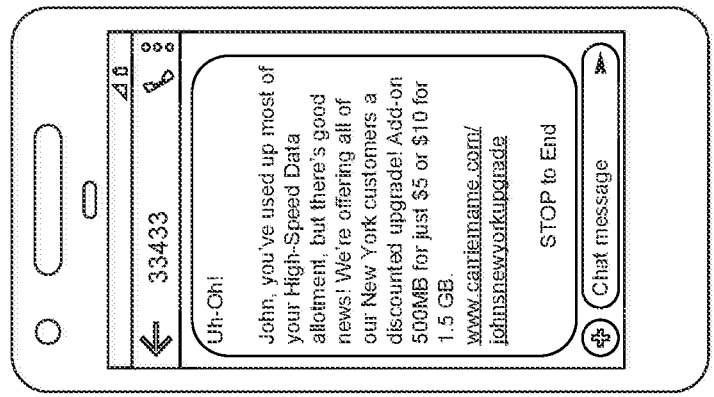
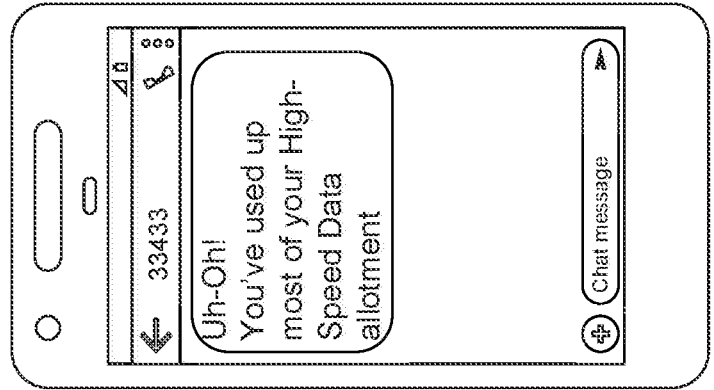

ENHANCING MESSAGES WITH DYNAMIC CONTENT

The present application is a continuation of and claims priority to PCT/US2020/052064 filed on Sep. 22, 2020, titled "ENHANCING MESSAGES WITH DYNAMIC CONTENT," which in turn claims priority to U.S. Ser. No. 62/904,546 filed Sep. 23, 2019, titled "ENHANCING MESSAGES WITH DYNAMIC CONTENT" all of which are hereby incorporated by reference in entirety for all purposes.

BACKGROUND

Businesses use text-based communications to communicate with customers for many purposes. Increasingly, text-based communication is powered by software agents (e.g., chatbots) that map user intent to pre-defined message flows. While the message flows can be made arbitrarily complex, in practice the content is predetermined, perhaps augmented with personalization information from a Customer Relationship Management (CRM) system or other context.

SUMMARY OF THE INVENTION

As present, chatbot technology is typically predetermined according to predefined message flows. Therefore, it is possible that a user interacting with the chatbot requests content not able to be provided to the user, or that opportunities to advertise or otherwise provide promotional content to users are missed. For this reason, there exists a desire to display dynamic promotional content to users. Such dynamic promotional content is typically not known at the time the message flow is originally defined, can be specific to a particular set of users, and can be targeted to users based on a particular to time of day, geographic region, or other criteria.

The systems and methods described herein propose a solution to the technical shortcomings of present text-based communications by enabling chatbots to perform dynamic (realtime) insertion and/or alteration of messaging components in order to allow presentation of promotional, advertising, or user-customized content. The solution presented herein further enables tracking of user interactions with such promotional to provide data useful for optimization of business objectives, such as promotional or advertising success through click tracking, interaction tracking, and conversion tracking. Such functionality provides businesses with a mechanism to increase revenue, improve customer retention, and achieve other important objectives.

In one embodiment, a method for augmenting message streams comprises receiving a request for augmentation of a message, the request including a parameter associated with the message; determining a rule associated with the message; applying the determined rule to the message parameters to select an augmentation component; and transmitting an augmented message to the requestor, the augmented message including the augmentation component.

In another embodiment, a system for augmenting message streams comprises a server configured to receive a request for augmentation of a message, the request including a parameter associated with the message; determine a rule associated with the message; apply the determined rule to the message parameters to select an augmentation component; and transmit an augmented message to the requestor, the augmented message including the augmentation component.

In another embodiment, a method for augmenting message streams is provided. The method may comprise receiving a request for augmentation of a message, the request including a parameter associated with the message and an identification of the requestor; obtaining attributes associated with the requestor identified in the request; combining the received requestor attributes with the received request for augmentation; determining a rule associated with the message; applying the determined rule to the message parameters and the received requestor attributes to select an augmentation component; and transmitting an augmented message to the requestor, the augmented message including the augmentation component.

In another embodiment, a system for augmenting message streams is provided. The system may comprise a server configured to: receive a request for augmentation of a message, the request including a parameter associated with the message and an identification of the requestor; obtain attributes associated with the requestor identified in the request; combine the received requestor attributes with the received request for augmentation; determine a rule associated with the message; apply the determined rule to the message parameters and the received requestor attributes to select an augmentation component; and transmit an augmented message to the requestor, the augmented message including the augmentation component.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings constitute a part of this specification, illustrate an embodiment of the disclosure, and together with the specification, explain the methods, systems disclosed herein.

FIG. 7 is a flow chart illustrating a method for click tracking of augmented message streams, according to an embodiment.

FIG. 12 is an illustrative example of an augmented message stream, according to an embodiment.

DETAILED DESCRIPTION

Figure 1:
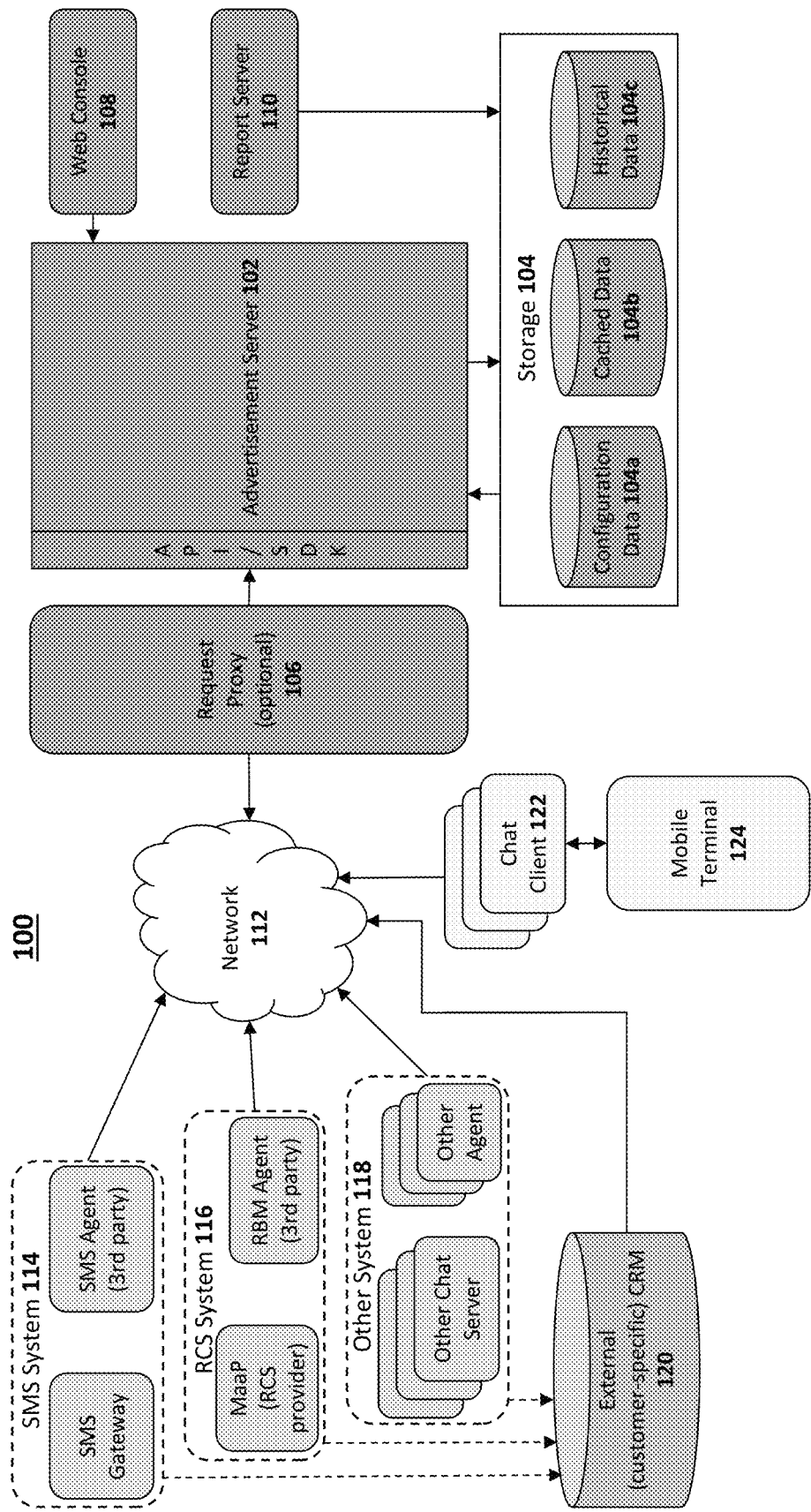
FIG. 1 is a block diagram illustrating a system for augmenting message streams, according to an embodiment.

Reference will now be made to the embodiments illustrated in the drawings, and specific language will be used here to describe the same. It will nevertheless be understood that no limitation of the scope of the methods/systems is thereby intended. Alterations and further modifications of the inventive features illustrated here, and additional applications of the principles of the methods/systems described herein as illustrated here, which would occur to a person skilled in the relevant art and having possession of this disclosure, are to be considered within the scope of the methods and systems described herein.

Referring now to FIG. 1, and in brief overview, a block diagram illustrating an embodiment of a system 100 for augmenting chatbot message streams is shown. System 100 includes a chat client 122 executing on a mobile terminal 124 that communicates with an SMS system 114, RCS system 116 or other messaging system 118 via network 112. System 100 also includes an advertisement server 102 that provides additional content in response to a request from the SMS system 114, RCS system 116 or other messaging system 118. Advertisement server 102 may provide a hook; functionality created through the implementation of an application programming interface (API), or provided as a software development kit (SDK), that connects an existing software chatbot to a web-based service. The API may be implemented as web services, and provide for configuration and runtime (e.g., advertisement fetch) capabilities. The SDK may be a publicly documented Software Development Kit to allow easy integration with various programming languages, such as Python or HTTP. The SDK typically exists as a wrapper over the API interfaces, but also provides performance optimizations and additional functionality related to privacy or security. The API/SDK may be installed on a processing device such as advertisement server 102, which may provide web-based services to the existing chatbot.

Still referring to FIG. 1, and in greater detail, advertisement server 102 may include a central processing unit (CPU), or other processing device configured to run an operating system on which the API/SDK may be installed. Generally, advertisement server 102 is communicatively coupled to a memory and configured to execute instructions stored in the memory. Such instructions may be altered by the API/SDK. Advertisement server 102 may connect to persistent storage 104. Storage 104 may be cloud storage or a physical hard drive configured to store relevant data, and may be connected to advertisement server 102 directly, by a local area network (not shown) or by network 112. Storage 104 may include a configuration database 104a to store matching rules, selection rules, and messaging component templates. Configuration database 104a may additionally store configuration data for users, moments, and components. Storage 104 may further include a cached database 104b, configured to store data used for quick lookups. Storage 104 may further include a historical database 104c, which may be configured to hold historical information, which may be used for report generation.

Still referring to FIG. 1, system 100 may also include web console 108 that provides role-based access to functionality related to configuration database and reporting. Web console 108 provides a web interface that customers may use to define moments, rules, components, as well as access realtime performance reports. Moments are specific points of a chatbot conversion where system 100 can be configured to insert a component, which may be text, images, and/or actions to display to the user for a particular moment. A customer may use web console 108 to specify components with particular moments, and set rules and frequency caps to determine how best to enhance the message returned to an end-user interacting with the chatbot.

Still referring to FIG. 1, SMS system 114, RCS system 116 or other messaging system 118 may fetch, or send a fetch request to advertisement server 102. A fetch request is a request for dynamic content in response to the detection of a moment, which is facilitated by the respective agent, and often includes a customer or subscriber identifier to identify the originating chatbot agent, a moment identifier, and targeting parameters. The targeting parameters may include key-value pairs used as inputs to rules within the advertisement server 102. Customers may define their own targeting parameters. The information included in the fetch request may be used by advertisement server 102 to apply customer-specific rules to determine content for best enhancing the chatbot conversation. Such rules may be specifications for how to use the moment and targeting parameters supplied in the fetch request to select an augmentation component to be returned to the end user. Advertisement server 102 provides an interface that mirrors the interface used to connect a chatbot agent to a messaging gateway. The chatbot agent is altered to send messages to the advertisement server 102, rather than the messaging gateway. Advertisement server 102 checks the rules configured in web console 108 in realtime against the message traffic, and takes action as necessary. The rules may be used to determine which components to insert as a payload into a chatbot message in response to the fetch request.

Still referring to FIG. 1, system 100 may further include a report server 110 that collects information generated by other system components, such as fetch requests, click events, and conversions, and intelligently processes it such that it can be used to understand and optimize business objectives via realtime and/or summary (batch) reports. Report server 110 may be further configured to deliver the reports via various transports (email, text message, cloud storage, ftp, via web console 108), to provide additional diagnostics information to customers.

In some embodiments, whenever a fetch request is received for which no component matches, advertisement server 102 records information about why various rules and components in the system were disqualified for consideration, and stores such information in historical database 104c, which is then made available to report server 110. This information is valuable in troubleshooting rule configurations, and may be recorded by instrumenting the fetch process, so that whenever a rule or component is filtered out from consideration (which normally happens because a targeting rule was not matched, or some frequency cap or other limit has been exceeded), a message is appended to an internal collection of the form: "Rule X was disqualified because it requires someParam=someValue, but "someParam" was not specified in the fetch request." All such messages are provided in the fetch response, and are stored in historical database 104c. Such messages may be made available to the customer by advertisement server 102 via web console 108 or via a report generated by report server 110. This saves considerable time in managing the system because it allows the customer using web console 108 or who configures report server 110 to detect problems such as misspellings of targeting parameters, or incorrect assumptions about the possible values parameters encountered at runtime.

Network 112 may be a wireless or a wired connection, and may further serve to connect advertisement server 102 to an SMS system 114, RCS system 116, or other system 118 configured to host chatbot agents. SMS system 114 may host an SMS agent, a customer-specific software application that integrates with SMS gateways. RCS system 116 may host an RBM agent, a customer-specific software application that integrates with Messaging as a Product (MaaP) gateways. The gateways are web services providing bidirectional communication services allowing a company to communicate with a subscriber over a particular channel, such as SMS, RCS, or the like, and are often provided by a third party. Other system 118 may host another type of chatbot agent on the other chat server that may be compatible with the APIs of advertisement server 102. Such agents are existing platform-specific services typically owned by the customer. An agent is primarily responsible for managing the flow of messages between a subscriber (user) and a company, and may be built atop a commercial provider or may be a custom implementation. In order to differentiate between the chatbot agents of different customers, advertisement server 102 may differentiate between networks, which are collections of moments, rules, components, and associated user accounts logically connected with a single customer property. A user account may be associated with more than one network if, for example, the customer manages multiple independent messaging channels.

In some embodiments, network 112 may also connect advertisement server 102 to an external customer relation management database 120 that is typically used to store targeting parameters. Targeting parameters can either be passed to advertisement server 102 as part of an API request, or can be queried by advertisement server 102 during the fetch processing if access to CRM database 120 has been configured. Additional targeting parameters may be retrieved from CRM database 120 in the event only a partial fetch request has been generated, as will be described with reference to FIG. 4.

In many cases, a chatbot is accessed by a mobile terminal 124 via a chat client 122. The chat client may be capable of connecting mobile terminal 124 to network 112, and thus to a chatbot agent hosted by chat client 122. When displaying the messages to the end user, chat client 122 may allow any chatbot agent currently connected to mobile terminal 124 to display the augmented content in the chatbot message exchange.

Advertisement server 102 may utilize a fetch service that determines whether a message should be inserted or altered, selects an appropriate alteration or insertion based on user-defined rules, and performs a manipulation of the original message to insert/modify it. Advertisement server 102 may also be programmed to provide an interaction-tracking service that detects and tracks interactions that chatbot users have with messaging components delivered by the system, including conversion events that may occur in a secondary medium, such as a website or interactive voice response (IVR) system.

In a typical integration of system 100, a customer will use the API or SDK compatible with their software environment to connect their chatbot agent to advertisement server 102. In this configuration, the chatbot agent communicates directly with advertisement server 102, perhaps via the SDK. This requires that the chatbot agent have all of the information necessary to generate a full fetch request, including all of the targeting parameters specific to the current subscriber. It also requires that the chatbot agent be able to handle service interruptions that could affect the fetch process, such as the temporary unavailability of an internal system that provides subscriber targeting information.

To deal with these types of situations, some embodiments of system 100 may include an optional request proxy 106. The request proxy 106 implements a chatbot agent-facing interface that looks and acts almost identically to the advertisement server 102 fetch service APIs, but provides the ability to be configured such that it can connect to customer-specific (internal) CRM systems. In addition, request proxy 106 can provide support for robust handling of temporary service unavailability and custom URL shortening.

Request proxy 106 allows chatbot agent requests to be augmented with additional information or capability before being processed by advertisement server 102. Request proxy 106 can, for example, communicate with customer-specific CRM 120 in order to provide additional targeting parameters at runtime, and it can provide redundancy and fault tolerance if external services are temporarily unavailable.

Request proxy 106 includes two distinct parts, a common part configured to handle functionality required by every customer, and a customer-specific plugin that handles custom interfaces with customer-specific systems. The customer-specific plugins can be implemented as webhooks provided by the customer. A typical implementation uses request proxy 106 to interface between advertisement server 102 running in the cloud and the customer's CRM systems, which may be running in a protected environment. For example, request proxy 106 could be configured with Internet Protocol (IP) whitelisting and authentication information that is specific to a customer, and provided as part of the customer's configuration. The connection between the webhook and the customer's CRM systems is controlled by the customer, so the customer can implement any additional/different security mechanisms they require.

In some embodiments, in addition to the customer-specific webhooks, request proxy 106 may maintain a local database that is capable of storing subscriber-specific targeting parameters. For example, if a customer wanted to segment their subscriber population into a number of cohorts for the purposes of a particular ad campaign, request proxy 106 may allow the customer to upload a CSV containing a mapping of subscriber identifiers to cohort identifiers, and assign those mappings to a particular targeting name (e.g., "cohort"). Request proxy 106 uses information from its local database to further augment the targeting information.

System 100 provides a multi-tenant web application, which means that multiple customers' data may be loaded into the same instance of the various databases used by the system. To keep each customer's data separate from each other's, all data records may have a field named "network", which uniquely identifies a particular customer network. The system has a data access layer between the databases and the program logic. This data access layer ensures that requests for data from the databases are only provided access to records with the appropriate network. For example, when a customer signs into web console 108, web console 108 authenticates the customer before allowing any requests of the API on advertisement server 102. The API uses the authenticated customer identification to provide the data access layer with the appropriate network for the customer. The data access layer will only process records that match the given (authenticated) network.

For simplicity, the rest of this document will omit the "network" property from the definitions of data records. It should be assumed that this property is always present in the database.

While described as having an advertisement server 102, it should be understood that the components of system 100 are capable of dealing with any type of messaging component on behalf of a customer. Customers use system 100 not just to serve revenue-generating advertisements, but also to insert customized messaging into chat-based communications that serve purposes other than direct revenue generation.

That said, for convenience we will use the language of advertisement serving to describe the functionality of system 100.

A customer provisions access to the functionality of system 100 by creating one or more accounts using the public-facing web console 108. Multiple user accounts may be associated with a particular network, and those user accounts may be either read-only or read-write. Once an account has been provisioned, one or more API Keys can be obtained from web console 108. API Keys are specified in API calls (or indirectly, via the SDK) and identify the customer's network in interactions with services of system 100. The customer uses web console 108 to specify moments, rules, and components (described below) that comprise the configuration data for the customer-specific network that together determine what messages will be delivered to customers in what situations.

With an account provisioned and an API Key, the customer adds one or more hooks to their chatbot agent. Hooks are typically created by inserting a call to the appropriate fetch routine provided by the SDK into the software powering the chatbot. When using a commercial chatbot platform, hooks may be provided using a platform-specific manner, such as by adding a label to a particular point in a dialog flow chart.

Hooks are used by the chatbot agent as a way to notify advertisement server 102 that some particular point in a customer conversation has been reached, and to allow advertisement server 102 to determine based on the current configuration and runtime context, whether any configured content (e.g., components) should be delivered to the customer. This process is known as a fetch (or fetch request) and is the core function of system 100. When handling a fetch request, advertisement server 102 looks at the specific moment and targeting parameters specified by the fetch request, compares them with the rules that have been configured by the customer and with historical information recorded about previous interactions in historical database 104c to determine if there is a component that would be appropriate to deliver to the customer.

The typical embodiment is for the hook to be integrated directly into a customer's chatbot agent by way of the SDK for the customer platform. The SDK can integrate directly with the gateway interfaces provided by SMS system 114, RCS system 116, or other system 118 and perform client-side functionality that improves performance.

If the SDK cannot be used, for example if the chatbot agent is written in an unsupported programming environment or using a third-party platform, the integration may make direct use of the APIs, which provide essentially the same functionality as the SDK but with more effort required on the part of the customer. It is also possible to integrate the hook in the gateway itself of a system via a custom integration of the gateway. This has the benefit of being able to enable the functionality of system 100 for a large number of chatbots without having to make any customer-specific changes. For example, the gateway could provide the functionality of system 100 to its customers allowing them to insert ads or other messages into conversations.

Finally, the hook can be configured such that it mimics the interface provided by the gateway, essentially acting as a man-in-the-middle between the chatbot agent and the gateway. This has the benefit of not requiring any changes to the chatbot agent or gateway other than minor configuration changes, such as changing the URL used by the chatbot agent to communicate with the gateway through the API/SDK.

If it finds an appropriate component, advertisement server 102 performs any dynamic processing appropriate (for example, a component may use a templated string, into which a customer's name should be inserted at runtime), and converts it from an internal data format into a format specific to the gateway being used by the chatbot agent, and returns it to the chatbot agent. The chatbot agent uses the services of the gateway to deliver the message to the customer.

When the customer interacts with the message, for example by following links in a message or otherwise interacting with a message, these interactions are tracked by advertisement server 102. Interaction tracking is often done by re-writing customer-supplied URLs to redirect through advertisement server 102, but in some cases may involve the SDK interacting with the gateway. For example, when an RCS message is delivered to a subscriber, the RCS gateway may notify the customer agent when the subscriber has read the message. This "read receipt" notification may be intercepted by the SDK running on the agent, and information about the event is forwarded to advertisement server 102 using the API.

When a subscriber follows a link from a message provided by advertisement server 102, it is generally redirected through an interaction-tracking service. This allows the click event to be tracked, and also provides an opportunity to provide the subscriber's user-agent with an HTTP conversion-tracking cookie. If the customer has a website on which product purchases or other goals may be fulfilled by subscribers, the customer can use the API Key provided earlier to put a tracking pixel or snippet of Javascript on the goal website that directs the subscriber's user-agent to make a web request to advertisement server 102. This allows advertisement server 102 to inspect the cookies on the user agent, and record a conversion associated with the subscriber if appropriate.

Every interaction between the chatbot agent and advertisement server 102, such as fetch requests, and interactions between subscribers and components, for example clicks and conversions, are recorded in historical database 104c, enabling advertisement server 102 to group the various events in such a manner that it can determine, for example, the relative click-through and conversion rates for different components using the same rule. Information such as this can be displayed by web console 108 so that the customer can view reports showing the volume and performance of their network, and optimize future delivery.

Figure 2:
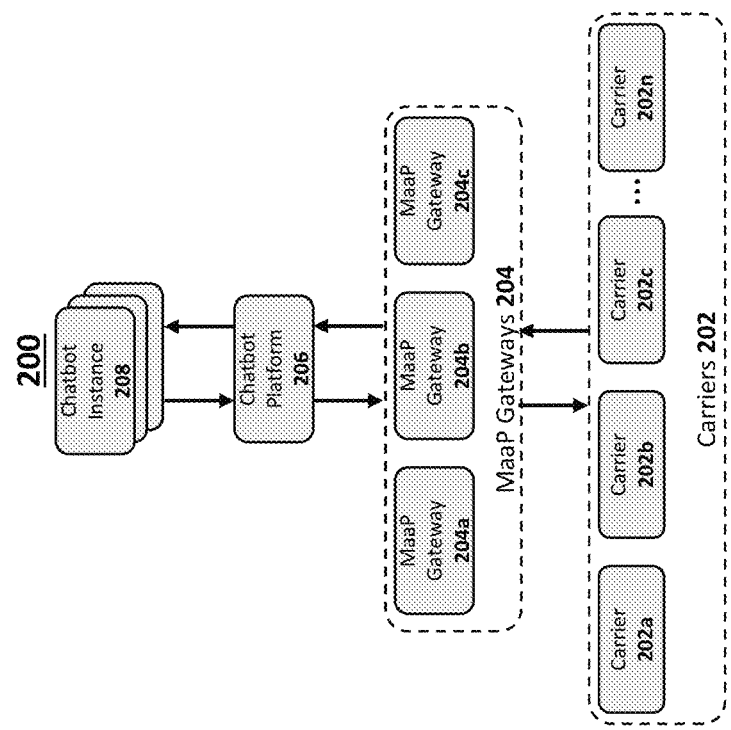
FIG. 2 is a block diagram illustrating a system for a messaging-as-a-product-level (MaaP) chatbot platform for augmenting message streams, according to an embodiment.

FIG. 2 is a block diagram illustrating an integration embodiment 200 of system 100 providing messaging-as-a-product-level (MaaP) chatbot platform for augmenting message streams, according to an embodiment. Text-based communications between a human and a chatbot often relies on multiple "back-and-forth" messages to accomplish a task. When adding a promotion or advertisement, it is desirable that the user can interact with the promotion in a similar way. For example, the user should be able to have a "side conversation" with the promotional content. Such a side-conversation would not normally be possible with a statically-defined intent-based conversation agent, because the information necessary to maintain state about the conversation must be known ahead of time.

Embodiment 200 allows for dynamically-inserted messaging components to have multiple interactions between the messaging component and a human user without modifying the underlying message script. This is done by essentially "pausing" the statically-defined conversation when a user interacts with a dynamically-inserted messaging component, and only resuming the original conversation when a specific event occurs. In order to pause the original conversation, the code that mimics the messaging gateway interface temporarily re-routes the message traffic that would normally flow between the human and the software agent such that it flows from the human to a software agent defined and controlled by a system such as system 100 of FIG. 1. For example, in embodiment 200, a chatbot platform 206 interfaces with a plurality of MaaP gateways 204. During a particular chatbot instance 208 with an end-user, chatbot platform 206 may receive a request to augment the content in chatbot instance 208. While the current conversation of chatbot instance 208 may be handled by MaaP gateway 204a, the chatbot platform 206 may reroute the request to a second MaaP gateway, such as MaaP gateway 204b such that the request can be handled without needing to pause the present interaction. This mechanism allows, for example, one company to "transfer" a conversation to a different software agent, potentially implemented by a completely different company, such as switching from carrier 202a to carrier 202b, without the user being required to change contexts.

In practice, many useful tasks can be accomplished with a scheme that allows for only a single additional back-and-forth message transaction between the user and the smart messaging component. For example, a promotion for a company service may be tapped on by a user. In response, a new messaging component could be presented that asks the user to enter their zip code, email, phone number, or some other type of information. The smart messaging component can collect this information, write a confirmation message, and then return the user to the original state of the conversation that occurred before they interacted with the smart messaging component.

Figure 3:
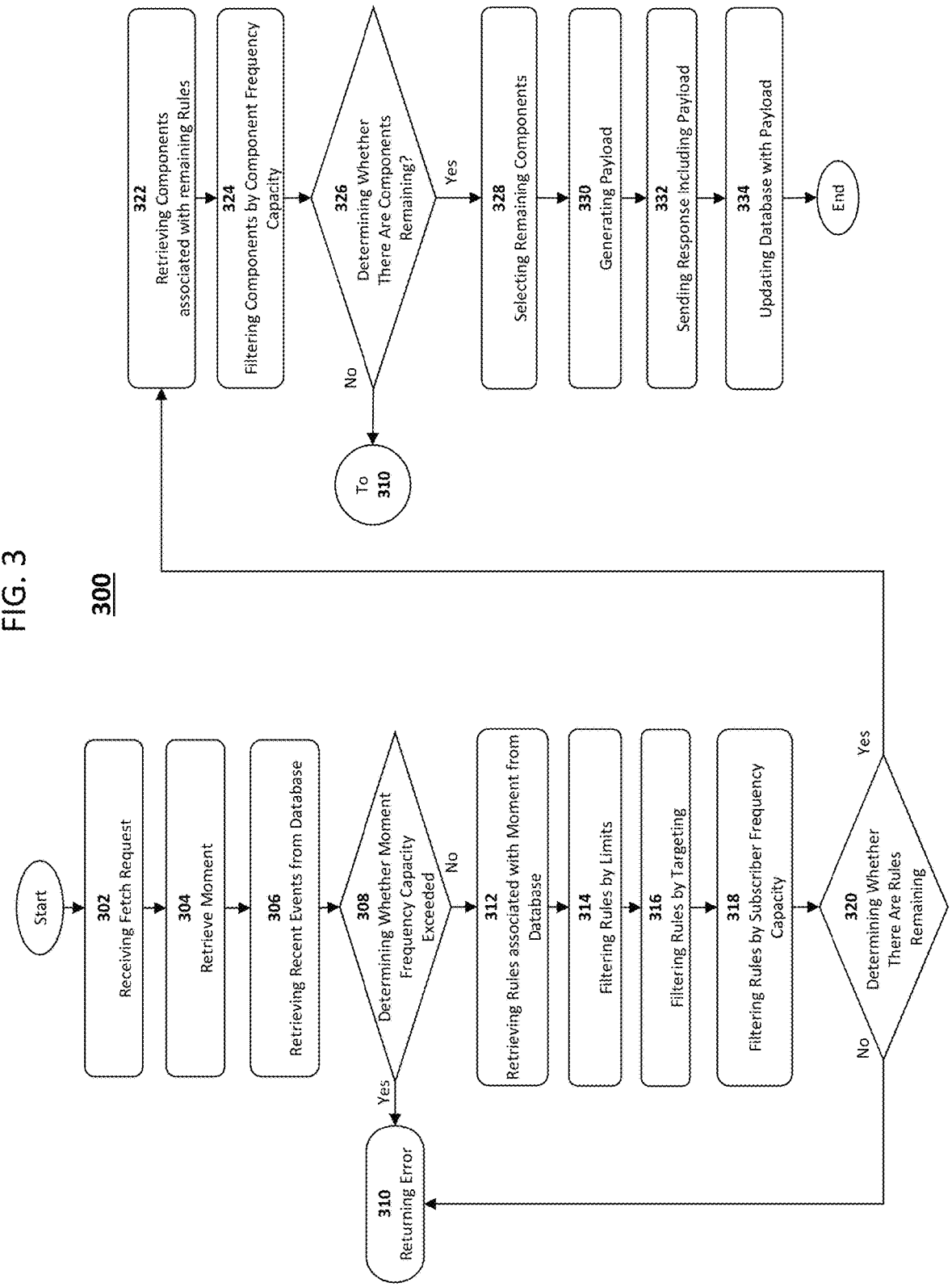
FIG. 3 is a flow chart illustrating a method for augmenting message streams, according to an embodiment.

FIG. 3 is a flow chart illustrating a method 300 for augmenting message streams in response to a fetch request, according to an embodiment. A fetch is the process used by the chatbot agent to request dynamic content from the advertisement server. FIG. 3 shows the sequence of steps used by the fetch service to fulfill a fetch request, which involves collecting (1) information from the fetch request, (2) configuration information from the configuration database, and (3) cached data from the cache in order to determine the appropriate best response, if any, for the fetch request. Method 300 may be implemented by a system such system 100 described with reference to FIG. 1, with particular reference to advertisement server 102. At the end of the fetch request, the fetch service will return either a fully-formatted message payload suitable for delivery to the chatbot agent's gateway (based on the format parameter provided in the fetch request), or an indication that no component was suitable for delivery. All of the parameters from the fetch request, as well as information about the returned message (if any), are stored in a historical database, such historical database 104c described with reference to FIG. 1, for future processing. Method 300 is a highly performance-sensitive operation and numerous optimizations have been made to ensure that it responds to the caller extremely quickly. For example, the recording of information in the historical database is deferred until after the HTTP response has been sent to the requestor, and subscriber-specific information necessary for the fetch processing is stored in a specialized in-memory datastore.

Method 300 may begin with a step 302, in which an advertisement server, such advertisement server 102, may receive a fetch request. The fetch request may be generated by a chatbot agent in response to detection of a moment. Moments may be configured by the customer using a web console, such as web console 108 described with reference to FIG. 1, or via an equivalent API interface. They are comparable to advertisement units in web-based advertisement serving technologies, consisting of simply a unique code that is bound to a human-readable name and/or description using the web console. The basic structure of a moment includes code such as a string identifier used to identify the moment programmatically, for example, an identifier passed by the chatbot agent as part of the fetch request. The moment may also include a human-readable name and description for display in the web console upon receipt of the fetch request at the advertisement server, which is connected to the web console.

The fetch request received at step 302 will now be described with reference to Table 1 below. Each fetch request includes different targeting parameters that serve as moment identifiers, a subscriber identifier identifying the subscriber operating the chatbot agent which generated the fetch request, and a format identifying the type of communication and thus the type of gateway for which any response message must be formatted.

TABLE 1

| Fetch Request Format | |
| --- | --- |
| Moment | moment-identifier |
| Targeting | key1-value1 |
| | key2-value2 |
| | ... |
| | keyN-valueN |
| Subscriber | subscriber-identifier |
| Format | ["SMS", "RBMv1", "FBM", . . .] |

In some embodiments of step 302, the chatbot agent will be configured such that it will specify a moment by code when calling the advertisement server's SDK fetch method (which itself sends the actual fetch request to the advertisement server). The fetch request may require that the moment code be specified, or the SDK may include special functionality enabling the chatbot agent to be written in such a way that it need not be aware of which moments have been defined at all. Instead, the moment may be auto detected by the SDK, and the SDK can specify the appropriate moment code for a fetch request. The ability to automatically detect moments may be achieved by using regular expressions (RegEx). For example, a customer may have defined a moment named "ORDER COMPLETE", which is used in the web console to define a set of rules and components that should be invoked when a subscriber has placed an order. Using the moment detection by Regex feature, the customer uses the web console to define a mapping from a regular expression to a moment, which may be stored in the database. For example, the regular expression "/order is complete/" might be mapped to the ORDER COMPLETE moment. The SDK may obtain a table of regular expression mappings at initialization, which may be updated during runtime. An example of the use of Regex is outlined below in Table 2.

TABLE 2

Regex Moment Mapping

| Regular Expression | Moment ID |
| --- | --- |
| /order is complete\./ | ORDER_COMPLETE |
| /welcome back/ | WELCOME |
| /visit us/ | CONTACT |

When the chatbot agent delivers a message to the subscriber, they also pass the text of that message to a conditional fetch method supported by the SDK, running locally on the chatbot agent. The agent may inspect the message, and compare the text portion of the message with its configured regular expressions. If it finds a match, the chatbot agent may be programmed to generate a fetch request to send to the advertisement server, specifying the moment that was specified in the rule. Such functionality prevents additional round trips to the advertisement server if no match is found, prevent transfer of potentially sensitive information over the network, and does not require updates to the chatbot agent configuration when new moments are added via the web console.

Method 300 may continue with a step 304, in which the advertisement server retrieves the moment from the fetch request received by parsing the content of the request. Step 304 may be followed by a step 306, in which the advertisement retrieves recent events from a database, such as historical database 104c described with reference to FIG. 1. During step 306, the advertisement gathers the information necessary to proceed to step 308, in which the advertisement server determines whether a moment frequency has exceeded a particular capacity (e.g., the number of moments of a particular moment identifier has exceeded a maximum in the specific chatbot instance executing method 300).

During step 308, the advertisement server uses the data obtained from the historical database to determine if a user-specific frequency capacity has been reached for the named entity for the identified moment. Frequency capacities may be applied to various entities, including ad units, line items, and creatives. Frequency capacities may also be applied to labels or collections. The format of frequency caps may be common to all entities, such as in the following example of an entity-embedded simple 'frequency' object:

```
{
    times: number// serve this entity at most 'times' times...
    interval: number,    // in every 'interval' milliseconds
}
```

Every subscriber has a redis hash that contains one key for each entity that they have been served. The value of each key is the timestamp of the time it was last served to them. An example of a frequency capacity limit used to determine yes or no in step 308 is as follows:

```
function isLimitReached(
    subscriberHash: { [key: string]: string }, key: string,
    frequency: { interval: number },
)   {
    if (!frequency || !frequency.interval) {
        return false;
    }
    const lastSendString = subscriberHash[key];
    let lastSend: number;
    if (lastSendString != null) {
        lastSend = parseInt(lastSendString, 10);
        if (isNaN(lastSend)) {
            lastSend = null;
        }
    }
    return lastSend && lastSend + frequency.interval > getCurrentTime( );
}
export function isAdUnitLimitReached(
    subscriberHash: { [key: string]: string },
    adUnit: IAdUnit,
): boolean {
    return isLimitReached (
        subscriberHash,
        adUnit._id.toString( ),
        adUnit.frequency,
    );
}
export function isLineItemLimitReached
    (subscriberHash: { [key: string]: string },
    lineItem: ILineItem,
): boolean {
    return isLimitReached
        (subscriberHash,
        lineItem._id.toString( ),
        lineItem.frequency,
    );
}
export function isCreativeLimitReached
    ( subscriberHash: { [key: string]: string },
    creative: ICreative,
): boolean {
    return isLimitReached(
        subscriberHash,
        creative._id.toString( ),
        creative.frequency,
    );
}
```

If the advertisement server determines in step 308 that a frequency capacity has been exceeded, method 300 may continue to a step 310, which includes returning an error by the advertisement server to the chatbot agent. If no such frequency capacity has been exceeded, the advertisement server determines no in step 308, and proceeds to a step 312.

Step 312 may include the advertisement server retrieving rules associated with the moment from a database, such as configuration database 104a described with reference to FIG. 1. The advertisement server may include a decision engine as part of the fetch service, which responds to a fetch request specifying a given moment depending upon the current customer configuration. In particular, rules are used to dictate which components, if any, are eligible to be returned for a given moments. If no eligible rules exist for a given moment, then a fetch request that specifies that moment will not respond with any content.

The rules specified in the configuration database provide the information necessary for the advertisement server to determine which components are eligible to be served for a given fetch request. Each rule consists of a set of targeting conditions, limits, and components. The targeting conditions are used to compare targeting parameters supplied by a fetch request. Only if all of the targeting conditions evaluate to true does a rule match a fetch request. When a rule matches a fetch request, each of the components associated with the rule is put into the eligible pool to be returned to the requestor; as such, when the advertisement server determines a particular rule does not match, the associated component is removed from the eligible pool. The limit-based rules allow the customer to specify things like a maximum number of times that the rule may match in a day, or the maximum number of clicks that a rule should be associated with before it is disabled. Method 300 may apply the rules in a step 314, in which the advertisement server filters rules by limits; a step 316, in which the advertisement server filters rules by targeting parameters; and a step 318, in which the advertisement server filters rules base on subscriber frequency capacity.

Step 314 may include the advertisement filtering the rules based on limits set by the customer via the web console. Such limits may include limiting the rules based on a max number of impressions or a number of impressions per day reached by the chatbot agent or specific chatbot instance. During step 314, advertisement sever may determine that certain rules do not apply based on the limits established by the customer for the moment specified in the fetch request.

Step 316 may include the advertisement filtering the rules based on the targeting parameters included in the fetch request. Such targeting parameters may include specific keys for which certain conditions must be met. The conditions may include equal to, is greater than, is less than, is not, is one of, or the like and a qualifying value to which to compare the key. Such targeting parameters may be specified by the end-user during the chatbot conversation, or may be automatically applied by the chatbot agent or advertisement server based on the moment. During step 316, advertisement sever may determine that certain rules do not apply based on the moment not meeting the conditions established by the rules. An example of code directed to filtering rules by targeting parameters is as follows:

```
export function ruleTargetingFilter
    ( rule_criteria,
     targeting,
): boolean {
    if (!rule.criteria) {
        return true;
    }
    for (const criterion of rule_criteria) {
        const key = criterion.key;
        const value = criterion.value;
        const comparator = criterion.comparator;
        if (comparator === "is") {
            if (!(key in targeting || targeting[key] != value) {
                return false;
            }
        } else if (comparator = = = "is not") {
            if (key in targeting && targeting [key] == value) {
                return false;
            }
        } else if (comparator = = = "is less than") {
            if (!(key in targeting) || targeting[key] >= value) {
                return false;
            }
        } else if (comparator === "is greater than") {
            if (!(key in targeting) || targeting[key] <= value) {
                return false;
            }
        } else if (comparator === "is one of") {
            const values = value.split(",");
            if (
                !(key in targeting) ||
                !values.some(v => targeting[key] == v)
            ) {
                return false;
            }
        }
    }
    return true;
}
```

Step 318 may include filtering rules according to a subscriber frequency capacity. In such a step, the advertisement server may determine from historical data that a particular subscriber has exceeded a number of fetch requests, which may be a subscriber (e.g., an end user) only having a certain number of fetch requests able to be fulfilled in a particular period of time. If such a rule applies, advertisement will remove any components from the eligible pool for which such frequency capacity limits may apply. Step 318 may be followed with a step 320, in which the advertisement server determines whether there are any rules remaining. If the advertisement server determines no, method 300 returns to step 310, and returns an error, because no components or content match the moment specific in the fetch request. If, during step 320, the advertisement server determines yes, method 300 may continue to a step 322.

Step 322 may include the advertisement server retrieving any components associated with the remaining rules from the configuration database. As previously described, any rules for which the moment is a match may have an associated component. As such, if any rules match the moment, an eligible pool of components is identified by the advertisement server for potential insertion into a fetch request response for augmentation of a chatbot message.

Components are specified by the customer using the web console or via an equivalent API interface. There are two primary types of components used for smart messaging: text components, and card components. A typical text component will consist of text payload and an optional action. A typical card component consists of one or more text strings, optional media such as an image or video, and one or more actions. Actions that are associated with components may be simple web hyperlinks, click-to-call buttons, or may open maps or other associated applications on a subscriber's device. Not all gateways support all action types, so, for example, a component intended for SMS delivery may only support simple web (HTTP) links as actions. Components may also be defined with one or more customer-specified properties. These properties are not interpreted by the advertisement server, but instead are provided to the chatbot agent as part of the fetch response. They allow the chatbot agent to track custom data associated with a component, such as a stock keeping unit (SKU) number or other internal information. Example code of a component and an associated action is as follows:

```
export interface ICreative extends Document
    { name: string;
    description?: string;
    format: string;
    payload?: {
        text?: {
            text: string;
        };
        card?: {
            url: string; title: string;
            description: string;
            cardOrientation: string;
            thumbnailImageAlignment: string;
            mediaHeight: string;
        };
    };
    actions?: [IAction];
    properties?: [IProperty];
    frequency?: {
        times: number;
        interval: number;
    };
    network: INetwork;
```

```
        }
        Action Definition
            export interface Iaction
            { actionType: string;
              text: string;
              action: string;
            }
            export interface Iproperty
            { name: string;
              value: string;
            }
```

Similar to step 318 of method 300, the advertisement server may perform a step 324 in which the eligible pool of components is filtered according to a component frequency capacity, which may be limited based on a type of subscription provided by a customer operating the chatbot agent to which a subscriber has subscribed. After filtering the components in step 324, method 300 may continue to a step 326, in which the advertisement server determines whether, after filtering, any eligible components remain. If the advertisement server determines no eligible components remain for augmentation of the message (no in step 326), method 300 proceeds to step 310, in which the advertisement server returns an error. If the advertisement server determines that eligible components remain (yes in step 326), method 300 continues to a step 328.

In step 328, the advertisement server selects any remaining components for insertion into the chatbot message as a payload of the message. The format of components is independent of any particular messaging technology or vendor-specific Gateway. When method 300 determines a component to return to the caller, it first renders (or converts) the component into a format that is understood by (or defined by) the gateway used by the requesting chatbot agent. The format into which the component is converted is specified using the format field of the fetch request. Multiple formats are supported, and a pluggable architecture allows new formats to be supported.

Method 300 may proceed to a step 330, in which the advertisement server generates a payload field of the fetch response message, in which the rendered component is returned as a simple string object. This object need not be interpreted in any fashion by the chatbot agent, rather it can simply pass the object unaltered to the appropriate interface supplied by their Gateway. This has the advantage of insulating the Agent from any changes to message formatting. Step 330 may generate the payload and format the fetch response according to the fields specified in Table 3.

TABLE 3

Fetch Response Format

| | |
|---|---|
| Message-id | Unique identifier that can be correlated with the fetch request |
| Payload | Message payload, suitable for passing directly to Gateway |
| Format | Specifies the format of the payload, e.g., SMS, RBMv1, FBM |
| Media | Collection of urls to media files that are included in the Payload |

Method 300 may continue with a step 332, in which the advertisement server sending the fetch response to the chatbot agent including the payload. In some embodiments, the advertisement server may utilize a fetch proxy, such as request proxy 106 described with reference to FIG. 1, to send the fetch response to the agent specified in the message-id property of the fetch response. Step 332 may include receiving a confirmation from the chatbot agent or host server of the agent that the fetch response was received properly.

In some embodiments, some Gateways that require a multi-step process of delivering messages to subscribers that contain embedded or linked media files. For example, a known gateway requires that before a message containing media files like images or videos can be delivered to a subscriber, those media files must have been previously uploaded to their servers using a proprietary interface. In order to simplify chatbot agent integrations, the SDK inspects the media property of all fetch responses received from the advertisement server, and automatically begins a process of uploading the necessary media files to the gateway. Once all of the media files have been uploaded, the payload is modified in order to fix up references to the media files (the files typically have a new URL assigned to the tem by the gateway upon upload), and the modified payload is then sent to the gateway.

After sending the fetch response with the payload, the advertisement server executing method 300 may proceed to a step 334 in which the advertisement server may update the database with the payload information. Step 334 takes place after step 332 to minimize processing time for the advertisement to respond to the fetch request. The advertisement server may update the historical database with the payload information by creating a database record including the information included in the original fetch request and the payload transmitted with the fetch response. By recording the payload and associated fetch request in the database, the advertisement server ensures that the subscriber records are updated upon the next execution of method 300, such that the limit or frequency capacity rules are applied to the next moment correctly. Method 300 may terminate with step 334, and may repeat upon receipt of another fetch request by the advertisement server.

Figure 4:
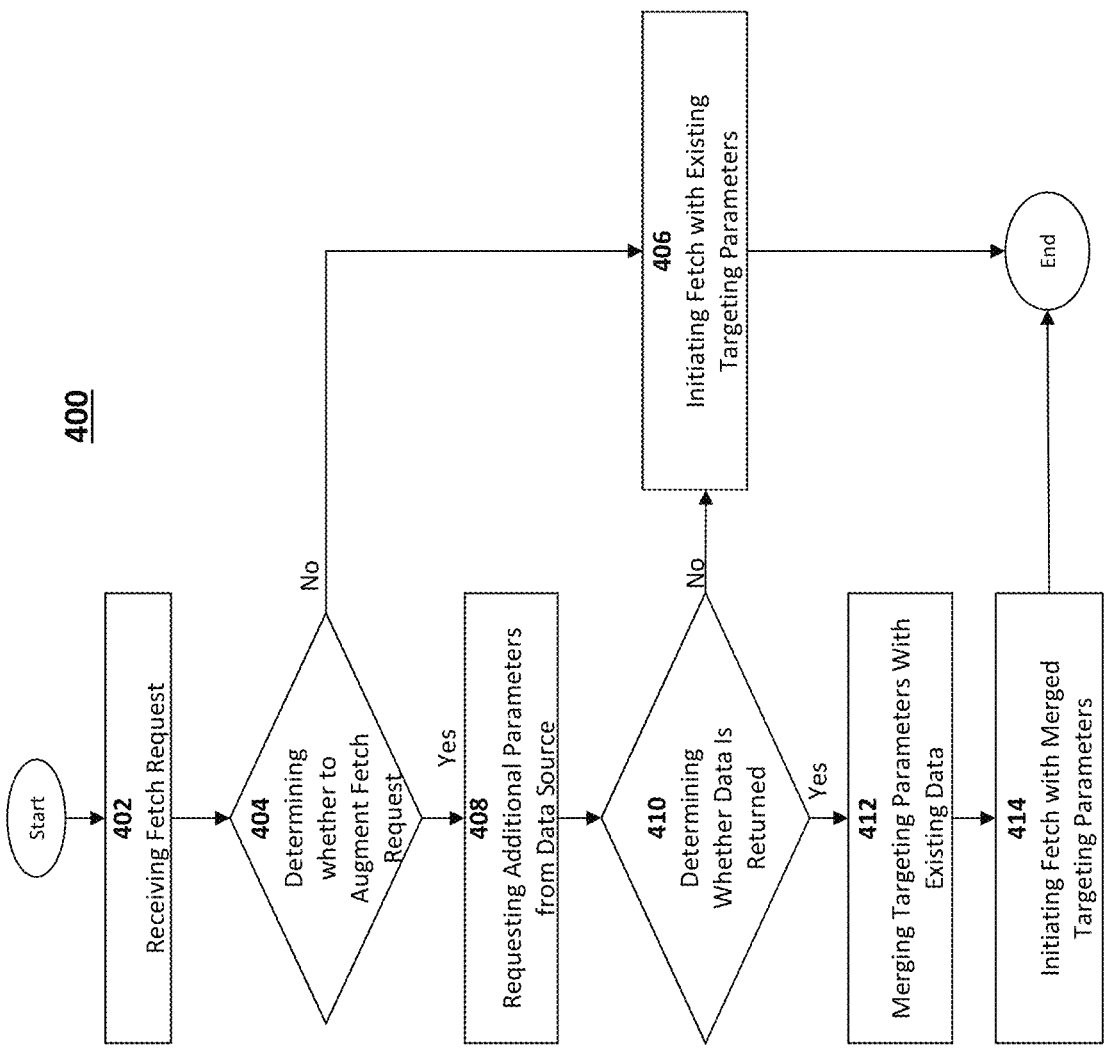
FIG. 4 is a flow chart illustrating a method for determining whether to augment a message stream, according to an embodiment.

FIG. 4 is a flow chart illustrating an example of a method 400 of augmenting a fetch request using a fetch proxy according to an embodiment. Method 400 is particularly useful in instances where a chatbot agent associated with a customer may not have access to customer-specific information stored in a customer relation management (CRM) database that is useful for targeting parameters. For example, a customer may utilize a third party to implement a chatbot agent, and the third party may not have access to the customer-specific information, or such an agent may be hosted in an insecure environment where customer security policy prevents agent access to an internal CRM system. Additionally, some software environments running the chatbot agent may not be suited to handling temporary service unavailabilities, or unresponsive external hosts. For example, some software environments do not allow for automated retries, or queuing of failed requests for later processing. Method 400 utilizing the fetch proxy can alleviate such shortcomings. For example, a primary use of method 400 includes augmenting a fetch request with targeting parameters that are unavailable to the chatbot agent at runtime through use of the fetch proxy.

Method 400 may be implemented by a system such as system 100 described with reference to FIG. 1. In particular, the fetch proxy may operate similar to request proxy 106. The fetch proxy may be configured to receive a partial fetch request from the chatbot agent and determine whether or not to augment the fetch request with additional parameters obtained from a customer-specific database at runtime, such as external customer relation management database 120.

The fetch proxy acts as an interface between chatbot agents and an advertisement server (such as advertisement server 102 of FIG. 1), and may be hosted in the cloud.

Method 400 may begin with a step 402, which includes the fetch proxy receiving a fetch request, fetch request may have been generated by the agent or by a server operating the agent, and includes subscriber identifier uniquely identifying the subscriber for whom the request is being made.

Method 400 may continue with a step 404, which includes the fetch proxy determining whether to augment the fetch request. Such a determination may be made by determining whether the fetch request is a partial fetch request, which is a valid fetch request, but omits some/all of targeting parameters used to determine which content to augment to the chatbot conversation, if any. If the fetch proxy determines that the fetch request is complete, method 400 may continue to a step 406. Alternatively, if the fetch proxy determines the that the fetch request is indeed a partial fetch request, method 400 may continue to a step 408.

Step 406 may include the fetch proxy initiating the fetch request with any existing targeting parameters included in the complete fetch request. Method 400 may end with step 406, and may repeat upon the fetch proxy receiving another fetch request.

Step 408 may include the fetch proxy requesting additional parameters from a data source. The data source may be a customer CRM system. The fetch proxy may make use of a secured interface to collect additional targeting parameters specific to the subscriber and situation based on the subscriber identifier. The interface between the fetch proxy and the customer-specific CRM providing the targeting parameters can be defined to use standard secure internet proxies. Such an interface may be a subscriber lookup webhook. This interface allows the fetch proxy to take an opaque subscriber identifier (which is provided in the fetch request from the agent) and pass it to the customer's configured webhook to retrieve a collection of name-value pairs representing targeting information for that subscriber from the customer CRM database, using the subscriber identifier as a key. Step 408 may include the fetch proxy making a call to the customer's CRM system using the configured "subscriber lookup" webhook, via an authenticated proxy. Multiple webhooks are allowed to be configured for a given customer, such that targeting information can be obtained from multiple sources throughout an organization, thereby enabling larger organizations having multiple databases storing information relevant for targeting to use method 400.

Method 400 may continue with a step 410, which includes the fetch proxy determining whether data (e.g., the requested additional parameters) is to be returned from the customer's CRM database. Step 410 may include the fetch proxy communicating via the customer's webhook with the internal CRM system to lookup name-value attributes (additional parameters) associated with the given subscriber identifier, and determining if any attributes exist in the database to be returned to the fetch proxy. If no attributes exist, method 400 may continue to step 406, and end. If step 410 returns additional parameters in the form of name-value attributes, method 400 may proceed to a step 412.

Step 412 may include merging the additional targeting parameters returned in step 410 with the existing targeting parameter included in the partial fetch request. In step 412, the fetch proxy combines the name-value targeting values obtained from the CRM (via the configured webhook) with any targeting values that had been provided in the original fetch request, thereby completing the partial fetch request.

Method 400 may continue with a step 414, which includes initiating the fetch request with the merged targeting parameters by the fetch proxy. In step 414, the fetch proxy forwards the augmented fetch request (i.e., the request with potentially additional targeting parameters) to the advertisement server for processing. Method 400 may end with step 414, and may repeat at a time when the fetch proxy receives a new fetch request.

Figure 5:
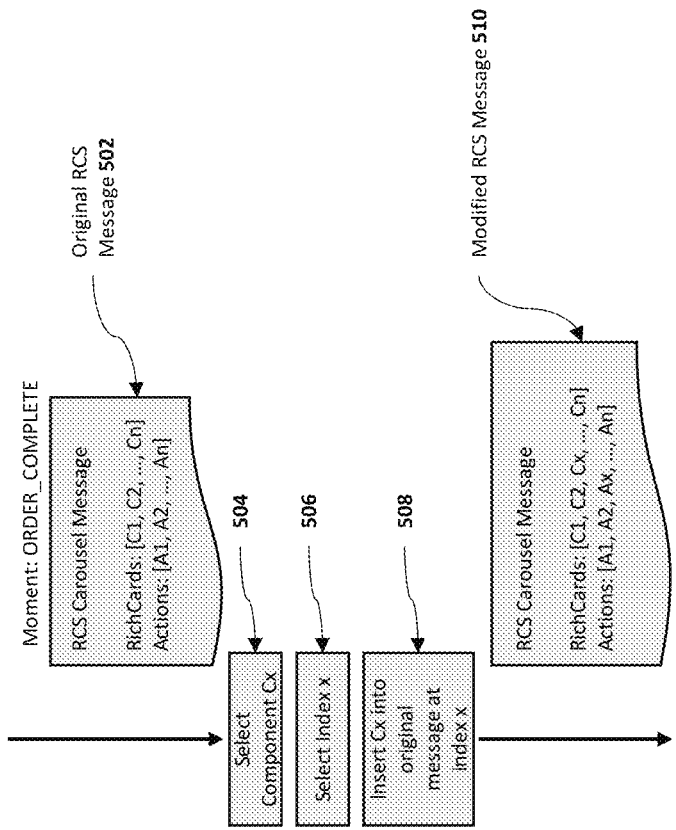
FIG. 5 is a block diagram illustrating augmentation of a message stream, according to an embodiment.

FIG. 5 illustrates a diagram 500 depicting augmentation of a message stream, according to an embodiment. Diagram 500 includes an original rich communication service (RCS) message 502 which includes a moment detected by a fetch proxy or advertisement server, such as request proxy 106 and advertisement server 102 described with reference to FIG. 1. Moments are entities defined by a customer using a system such as system 100 of FIG. 1. A moment may be defined by a regular expression matching the content of a sent message, or by a unique identifier. In a typical configuration, the chatbot agent is configured to specify a particular moment by use of an identifier when it makes a fetch request, and passes the moment identifier to the SDK interface, which then passes the identifier to the advertisement server.

RCS message 502 is structured to include a carousel data type including a plurality of rich cards and associated actions, with a specified moment of "ORDER COMPLETE." When the chatbot agent initiates a fetch request, it can call an extendedFetch, and include the message ready to send to the end user via the messaging gateway, such as in the following fetch request example code:

Moment: "moment-name"
Targeting: [ . . . ]
Subscriber: "subscriber-id"
Carousel: [firstItem, secondItem, thirdItem]

When a carousel data type is delivered, as in the embodiment of FIG. 5, the advertisement server may be configured to take the original message (e.g., RCS message 502) and use all existing fetch functionality to determine whether a smart messaging component can be selected for the moment. Such functionality includes the server selecting a component Cx in a step 504. Selecting a component may include inspecting the carousel to determine if it has a matching rule which may be predetermined for the data type. If a match is found, a custom card (e.g., component Cx) is selected. The server may also determine an index x at which to insert component Cx in a step 506, and insert component Cx into RCS message 502 at index x in a step 508 to modify the makeup of the original carousel of RCS message 502 such that the selected card is inserted into the message. Any associated actions are redirected through tracking server to measure engagement with the newly added card. Such steps combined performed on RCS message 502 results in a modified RCS message 510 including the additional component Cx and associated action Ax. Modified RCS message 510 may be returned to the chatbot agent as in the following return example code:

Carousel: [firstItem, secondItem, smartComponent, thirdItem]

The above may be optimized in cases where the SDK has been installed on the chatbot application. In this case, the chatbot agent need only send the typical fetch request, and the client side code can handle the insertion of the smart messaging component. This can be done without the chatbot application knowing whether it is done client-side or server side.

In order to control the conversation flow, the present invention defines several "template" conversations that have a well-defined shape. A publisher can allow certain templates and define keywords that are used to return to the original conversation. Such templates may include, but are not limited to, adding a rich card to an existing carousel, adding an action to an existing message, defining a matching rule that determines when insertion should occur, defining one or more custom rich cards, and defining a set of rules that determine selection criteria for the cards.

In some embodiments, to avoid sending every message to an external server, as it may be prohibitively expensive in terms of time or computing power, a subset or compressed version of the rules database may be transferred to the hook code during initialization or at any subsequent time. This allows the hook to prescreen messages, and if a message is deemed to not be a match based on configured rules, the step of sending it to the advertisement server can be skipped.

Figure 6:
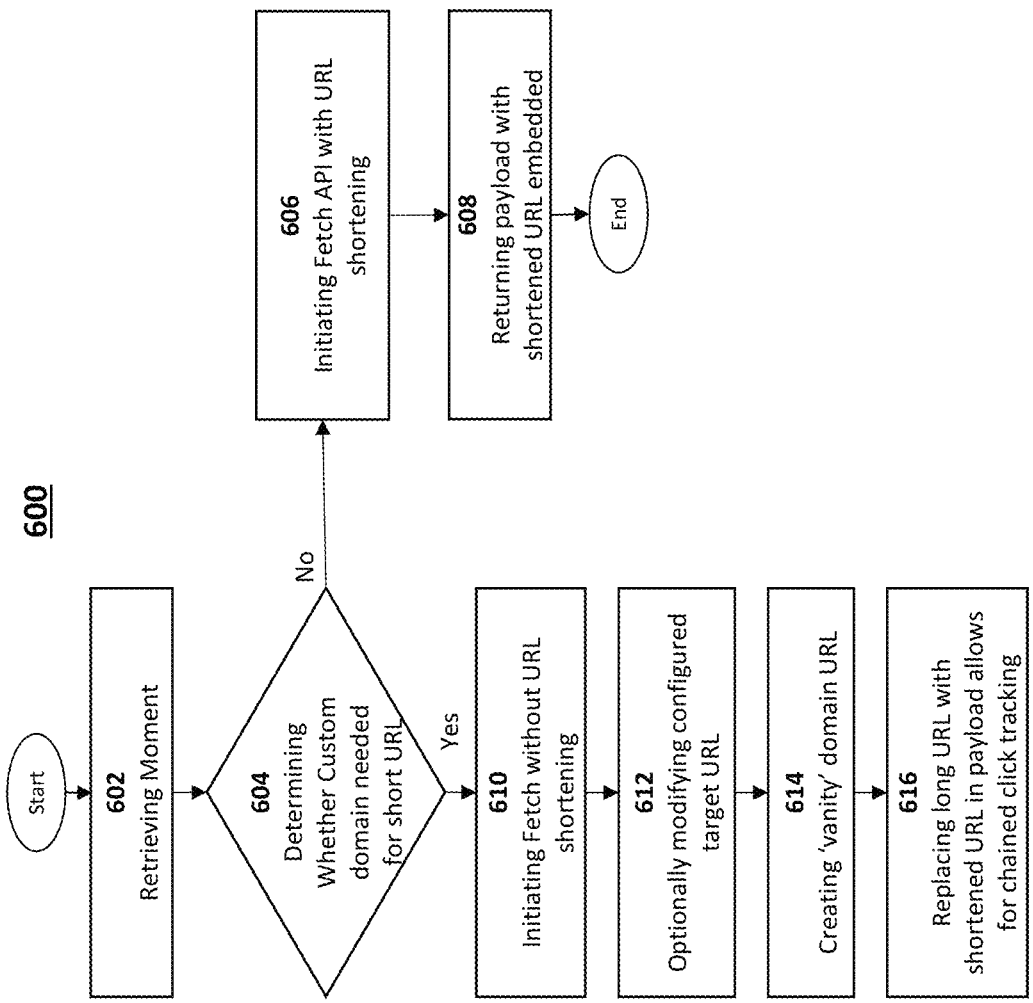
FIG. 6 is a flow chart illustrating a method for generating a shortened uniform resource locator (URL) for click-tracking in augmented message streams, according to an embodiment.

FIG. 6 is a flow chart illustrating a method 600 performed by a fetch proxy for shortening uniform resource locators (URLs) for chained click tracking. Every action that is delivered as part of a component may be associated with an external web URL or other clickable entity. When rendering a component, a customer-specified URL may be wrapped in a fetch proxy-specific URL. Therefore, when the subscriber invokes the action, the fetch proxy in conjunction with the advertisement server (such request proxy 106 and advertisement server 102 described with reference to FIG. 1) receives the request, records information about it, and then uses an HTTP redirect to redirect the subscriber's user agent to the originally-specified target.

Method 600 provides for generation of short URLs for any subscriber-visible URLs delivered as part of components. For example, a hyperlink to a web pages may be specified by the customer as "https://www.example.com/acme/123", but may be rewritten as something like "https://drqt.io/1234" when served to the subscriber. Another use of method 600 is to provide custom URL shortening services to a customer. This allows a customer to use their own custom domains in short URLs that are visible to the subscriber, and also provides another layer of integration with third party analytics ("click tracking") providers. So instead of the subscriber seeing "https://drqt.io/1234", they can instead see "https://myco.com". Such functionality contributes to branding and security by showing a subscriber trusted domain, and provides redirection of all clicks through custom domain for external tracking/analytics.

Method 600 may begin with a chatbot agent retrieving or otherwise identifying a moment from a message in a step 602. Step 602 may include sending a fetch request to a fetch proxy, such as request proxy 106 described with respect to FIG. 1. In response to receiving a moment from a chatbot agent, the fetch proxy may continue method 600 by proceeding to perform a step 604, in which the fetch proxy determines whether a custom domain is needed for a short URL. If the fetch proxy determines no in step 604, method 600 may continue to a step 606. Otherwise, if the fetch proxy determines yes in step 604, method 600 continues to a step 610.

Step 606 includes initiating a fetch request by the fetch proxy using non-custom URL shortening, and sending the fetch request to the API/SDK of the advertisement server. Upon completing transmission of the fetch request, method 600 may continue with a step 608, in which the advertisement server returns a payload (e.g., component and action) embedded with the shortened URL link, such that when the subscriber taps the component, the web browser in which the chatbot agent is operating will be redirected accordingly. Method 600 may end with step 608, and may repeat at a time when the chatbot agent identifies another moment.

Step 610 includes initiating a fetch request by the fetch proxy with URL shortening, and sending the fetch request to the API of the advertisement server. Upon completing transmission of the fetch request, method 600 may continue with a step 612, in which the advertisement server may optionally modify a configured target URL with dynamic or subscriber-sensitive data. Such modification in step 612 may include inserting substitution strings or modifying other parameters, which may be configured in a web console (such as web console 108 described with reference to FIG. 1).

Method 600 may continue with a step 614, in which the advertisement server creates a vanity domain URL using a subscriber-specific domain string. Such a string may be specified in advance by the subscriber (e.g., customer) using the web console to define the domain name. Such URL generation may follow conventional or known methods of generating customer-specific domain names using strings. Method 600 may continue with a step 616, which includes replacing the long URL with the shortened URL in the payload (e.g., the message). Step 616 may include the advertisement server delivering the payload to the chatbot agent, complete with the shortened URL and component matching the rules determined by the advertisement server. Method 600 may end with step 616, and may repeat at a time when the chatbot agent identifies another moment.

FIG. 7 is a flow chart illustrating a method 700 for click tracking as performed by a fetch proxy and advertisement server, such as request proxy 106 and advertisement server 102 described with respect to FIG. 1, according to an embodiment. Method 700 may occur in conjunction with method 600 described with reference to FIG. 6. Method 700 operates the same regardless of whether custom URL shortening occurs in method 600. Generally, method 700 includes receiving a payload request which is answered by the advertisement server, which inserts a component complete with an action-URL which, when selected by a user, sends a web request to, in the case of a custom URL, a custom endpoint, which redirects to a system-specific URL hosted by the advertisement server. The advertisement server may record information from the web request in a database, such as storage 104 described with reference to FIG. 1, and then redirect the user to a customer URL around which the system-specific was wrapped in method 600.

Method 700 may begin in a manner substantially similar to method 600 with a step 702 in which the advertisement server receives a payload request either directly from a chatbot agent or from a fetch proxy. Step 702 may occur when a chatbot agent detects a moment in a conversation with a subscriber, which may prompt the chatbot agent to send a partial fetch request to the fetch proxy or a full fetch request directly to the advertisement server. After receiving the fetch request in step 702, method 700 may continue with a step 704, in which the advertisement server selects a component containing an action-URL as a payload for insertion into a chatbot message in response to the fetch request. The action-URL may include an original customer URL for the user to access when selecting the component tied to the action-URL.

Method 700 may continue with a step 706, in which the advertisement server performs parameter substitution on all action-URLs in a component to customize the action-URLs to the subscriber- or customer-specific configurations set by the customer in a web console (such as web console 108 described with reference to FIG. 1). In step 706, the advertisement server may customize the strings included in the action-URLs to include information such as a server identifier, customer identifier, component identifier, or other information used to identify the origin and destination of the URL.

Method 700 may continue with a step 708, in which the advertisement server wraps the action-URL in a click-wrapper, such that the action of clicking on the component redirects a web browser of the user to the URL contained in the click-wrapper, which is hosted by the advertisement server. Step 708 may be followed by a step 710, in which the advertisement server may generate the custom URL for the component by writing an entry in a database. Such an entry may include the action-URL associated with the custom shortened URL generated, thereby enabling the advertisement server to redirect the user to the custom shortened URL when the user accesses the server-hosted action-URL.

Method 700 may continue with a step 712, in which the advertisement server delivers a payload including the click-wrapped and shortened URLs to the chatbot agent from which the fetch request was received. Step 712 may further include displaying the payload as a selectable component within the present chatbot conversation being hosted by the agent. Step 712 may also include the chatbot agent monitoring the chatbot conversation for an interaction of the user with the component displayed. When such an interaction occurs, method 700 proceeds to a step 714, in which the request to access the shortened URL (e.g., the custom endpoint) is redirected to the advertisement server. When redirected to the advertisement server first, the advertisement server performs a step 716 including recording the click in the database associated with the shortened URL of the component, the database record including a subscriber identifier, fetch identifier, or the like to identify the data record. The click-tracking portion of method 700 terminates with step 716.

Method 700 may continue with a step 718, in which, after recording the click in the database in step 716, advertisement server sets a cookie in an HTTP redirect response, and follows step 718 with a step 720 in which the advertisement server redirects the user to the original action-URL encoded in the click-wrapper. During steps 716 through 720, the user is redirected twice but reaches only a single end destination, that of the original action-URL, with the original action-URL now containing the cookie added in step 718.

Method 700 may continue will a step 722, in which, when the customer is redirected to the original customer URL configured in the action-URL, the user device accessing the original URL may store the cookie in a local datastore. The user device may be similar to mobile terminal 122 described with reference to FIG. 1. After storing the cookie, method 700 may continue to a step 724 in which the user device will render the original URL to the user, such that the user may interact with the content included there. Method 700 may terminate with step 724, and may repeat at a time when the advertisement server has received another payload request.

In some embodiments, the chatbot agent may pre-fetch the URL. In such an instance, the URL may not be selected by the user, and the advertisement server will detect such a redirect as a non-user-initiated request. The advertisement server will not record such a redirect as a click, but will still redirect the request to the originally configured URL, which may include bot-specific content for display to the user.

Figure 8:
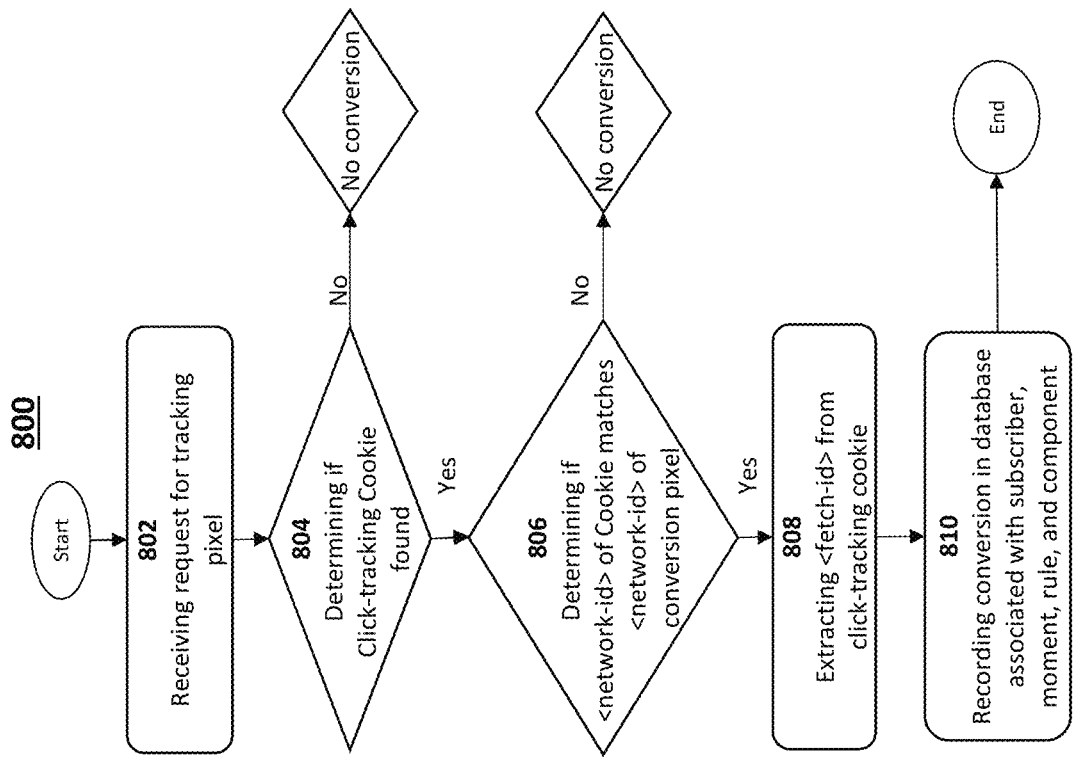
FIG. 8 is a flow chart illustrating a method for conversion tracking of click-tracked augmented message streams, according to the embodiment of FIG. 7.

FIG. 8 is a flow chart illustrating an example of a method 800 for conversion tracking of components, according to an embodiment. A conversion is a record that a subscriber performed some activity that was the desired outcome of sending them a component. Typically, a conversion is associated with performing some action on a web page, though it may be an action performed in another manner, such as completing a phone call or purchasing a product in a physical store. Method 800 may be performed by an advertisement server, such as advertisement server 102 described with reference to FIG. 1.

Method 800 may occur in response to a subscriber clicking on an action in a component, after which the subscriber is redirected through the advertisement server as described with reference to FIG. 7. As part of the click tracking, the subscriber's user agent is provided with an HTTP cookie ("click-tracking cookie") that records a unique identifier ("fetch-id") associated with the original Fetch Request that generated the Component. Because this fetch-id is stored in a database accessible to the advertisement server, and associated with the fetch request, having the fetch-id gives the advertisement server enough information to know which subscriber, moment, rule, and component are associated with it.

Method 800 may begin with a step 802 in the advertisement server receives a request for a conversion tracking pixel in order for the customer to know if a particular action of value has been taken by a subscriber (e.g., a "conversion" has occurred). The conversion tracking pixel is an HTML element that, when rendered by a subscriber's web browser, results in an HTTP request being made to the advertisement server. A conversion tracking pixel looks like:

<image height="1" width=1" style= "display:none" src="https://api . . . io/event?key=<apikey>&name=<conversion-type>">

The customer can cause this pixel to be displayed to a subscriber by placing it on a web page, html email, or other HTML interface. This pixel or script generates a web request to the advertisement server whenever a web visitor sees the page on which it is integrated. If the web visitor is a subscriber who had previously clicked on an action provided by the advertisement server, and therefore gone through the click-tracking process described above, their user agent will provide the HTTP cookie generated earlier as part of the fetch request.

Method 800 may continue with a step 804, in which the advertisement server determines whether a click-tracking cookie is found in the request for the tracking pixel. If, in step 804, the advertisement server determines that the click-tracking cookie is not found in the request, no conversion is deemed to have taken place, and method 800 may end without the advertisement server taking further action.

If, in step 804, a click-tracking cookie is found, method 800 may proceed to a step 806 in which the advertisement server determines if a network-id property of the click-tracking cookie matches the network-id associated with the API key specified in the conversion tracking pixel. If the advertisement server determines no in step 806, method 800 may end without the advertisement server taking further action. If the advertisement server determines yes in step 806, method 800 may proceed to a step 808.

In step 808, a conversion is deemed to have occurred. In this situation, the fetch-id property is extracted from the click-tracking cookie by the advertisement server. Method 800 may proceed to a step 810, in which the fetch-id property is used to determine the subscriber, moment, rule, and conversion associated with the original fetch request. This information is used to write a conversion event to a database such as historical database 104c described with reference to FIG. 1, and update counters that are visible to the customer in reports and journals. Method 800 may end with step 810, and may repeat at a time when the advertisement server receives another request for a tracking pixel.

Figure 9:
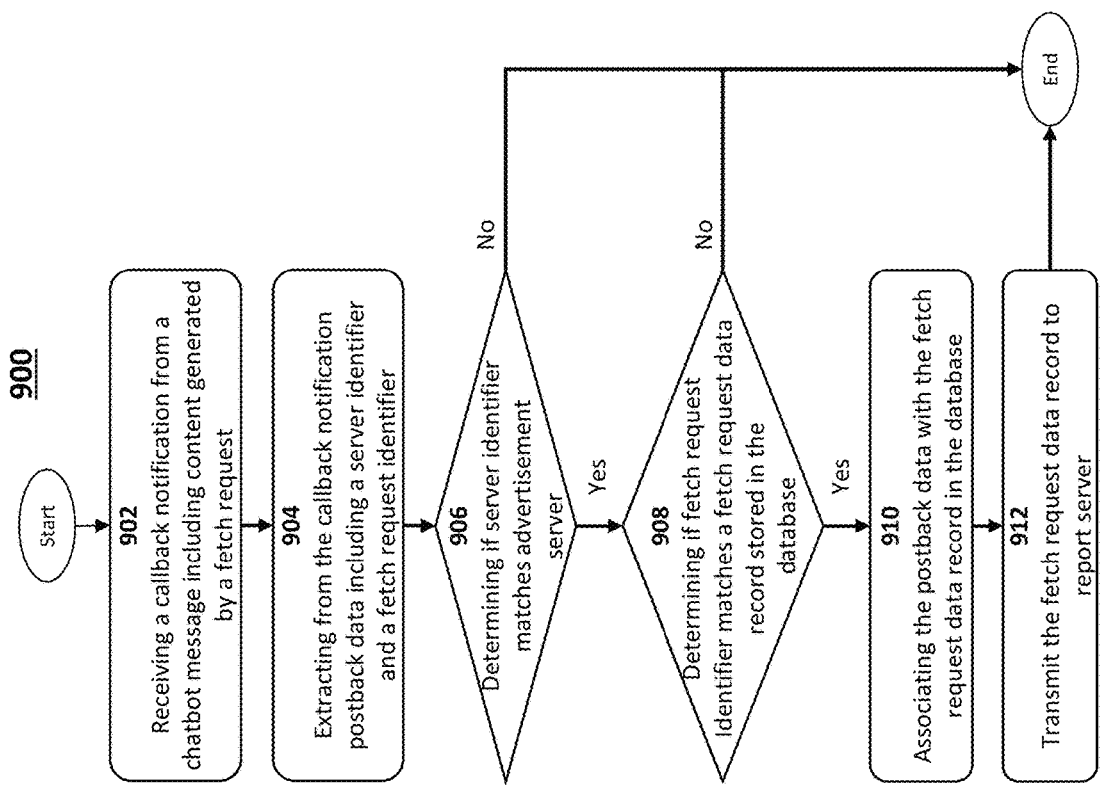
FIG. 9 is a flow chart illustrating a method for interaction tracking of augmented message streams, according to an embodiment.

FIG. 9 is a flow chart illustrating a method 900 for interaction tracking of augmented message streams, according to an embodiment. In addition to tracking subscriber clicks on actions that represent web (HTTP) targets, the advertisement server can track other interactions between a subscriber and a message component. For example, in some components, an action may cause the subscriber's user agent to start a telephone call, or to open a local application on their device. Because these actions do not always involve making web requests, it is not possible to use traditional click-tracking mechanisms that rely on using intermediate HTTP servers to record clicks, and redirect to the target. The customer is therefore unable to use traditional click-tracking to understand whether and/or how much subscribers are interacting with message elements when non-HTTP Action targets are used.

In order to give customers visibility into which actions are interacted with by a subscriber, and which conversions occur after the subscriber has interacted with messaging components via actions that do not generate web requests, the advertisement server supports interaction tracking, by execution of method 900. Interaction tracking records events for subscriber actions taken in rich messaging client applications, such as tapping on "click-to-call", "click-to-open-application", or the like.

Some gateways provide agents with a mechanism by which the agent may be notified when the subscriber has read a message. The advertisement server, via hooks in the SDK, can process these read receipts and record them as subscriber interactions. By associating read receipts with specific fetch requests, customers gain more insight into how subscribers are interacting with ads. In alternative embodiments, some gateways work with the software on the subscriber's device to provide a mechanism by which a chatbot agent may receive a callback when a subscriber interacts with a message element. For example, when an end user taps on a chip provided as part of a message, the gateway will send the agent that originated the chip a notification message. The notification message may include custom postback data that was provided by the chatbot agent when the message/chip was originally sent. Method 900 may begin with a step 902, in which the advertisement server receives a read receipt or a callback notification from a chatbot message including content generated by a fetch request.

Method 900 may continue with a step 904, in which the advertisement server extracts postback data including a server identifier and a fetch request identifier. When the advertisement server renders actions into a gateway-specific format, it associates with each rendered action postback data that is a string beginning with a specific prefix, such as, "@-". During step 904, the SDK utilizes a handler to receive all notification messages generated by the gateway (i.e., whether they are associated with messages created by the advertisement server or not) and inspect the postback data associated with the notification, looking for the specific prefix.

In a step 906 of method 900, the handler determines whether the server identifier matches that of the advertisement server, effectively recognizing when an action generated by the advertisement server has been taken by the subscriber. This is achieved by the handler determining the server identifier includes the specified prefix, thereby determining "yes" in step 906. This allows such actions to be distinguished from postback events generated by the chatbot application itself. The messaging gateway will communicate to the chatbot agent that the user has taken a suggested action by sending postback data that was originally associated with the action. Every time such postback data is sent to the chatbot agent, it passes it through a function of the SDK determining if the data is associated with an action generated by the advertisement server, check_postback_data( ). If the handler determines no in step 906, method 900 may terminate without further action on behalf of the handler, chatbot agent, or advertisement server.

Upon determining "ye" in step 906, method 900 may continue with a step 908. In addition to the prefix, the custom postback data includes other information, including the fetch-id associated with the original fetch request that generated the component. As part of step 908, the SDK may extract this information and send it to an endpoint on the advertisement server handled by the interaction-tracking service that is conceptually very similar to the custom endpoint used for click-tracking. During step 908, the advertisement server may confirm that the received fetch-id matches that of a fetch request data record stored in the historical database. Upon identifying a matching fetch request data record, method 900 may proceed to a step 910.

During step 910, the advertisement server updates the data record of the fetch request with the associated postback data, where it can be tracked and/or trigger additional actions. For example, if the subscriber had tapped on a "click-to-call" chip that had originally been defined as an action, the advertisement server can record this event in its logs. Method 900 may further include a step 912, in which the advertisement server transmits the fetch request data record including the newly added postback data to a report server, such as report server 110 described with reference to FIG. 1. The report server may make such data records available via reports and journals. Method 900 may terminate with step 912, and may repeat upon receipt of another read receipt or a callback notification from a chatbot message.

To provide an illustrative example of the above described embodiments, the following code serves as an example hook utilized by the systems and methods herein:

```
const express = require ( 'express' );
const request = require ( 'request' );
const app = expresss( ).use( require (
'body-parser' ).json( ));
const PAGE_ACCESS_TOKEN =
process.env.PAGE_ACCESS_TOKEN ||
"<invalid>";
let VERIFY_TOKEN = process.env.VERIFY_TOKEN ||
"<provide-your-own-
secure-token>" ;
const _PLAYGROUND_API_KEY = "5rp26o1WB5IBQ6gVTg"
; // acceptable for
use in testing
const _API_KEY = process.env._API_KEY ||
_PLAYGROUND_API_KEY;
const _API_SECRET = process.env._API_SECRET
|| null;
const _API_ROOT = process.env._API_ROOT ||
"https://api..io";
app.listen(process.env.PORT || 1337 , ( ) =>
console .log( ' example webhook is
listening' ));
app.get( '/webhook' , (req, res) => {
    let mode = req.query[ 'hub.mode' ];
    let token = req.query[ 'hub.verify_token' ];
    let challenge = req.query[ 'hub.challenge' ];
    if (mode === 'subscribe' &&
    token === VERIFY_TOKEN) {
```

```
        console .log( 'WEBHOOK_VERIFIED' );
        res.status( 200 ).send(challenge);
    } else {
        res.sendStatus( 403 );
    }
});
app.post( '/webhook' , (req, res) => {
    let body = req.body;
    if (body.object === 'page' ) {
        body.entry.forEach( function (entry) {
            let webhook_event = entry.messaging[ 0 ];
            let sender_psid = webhook_event.sender.id;
            if (webhook_event.message) {
                handleMessage(sender_psid,
                webhook_event.message);
            }
        });
        res.status( 200 ).send( 'EVENT_RECEIVED');
    } else {
res.sendStatus( 404 );
}
});
function handleMessage(sender_psid, received_message) {
    let response;
    if (!received_message.text) {
        return
    }
    response = {
        "text" : `You said: "
        ${received_message.text} "`
    };
    callSendAPI(sender_psid, response);
    const exampleMoments = [
        "text" , // => "fbm-text"
        "rich-card" , // => "fbm-rich-card"
        "media" // => "fbm-media"
    ];
    // e.g., "Rich card. " => "rich-card"
    const m = received_message.text.toLowerCase( ).replace(
    /\W/g , "-" );
    if (exampleMoments.some(moment => moment === m)) {
        fetch(sender_psid, "fbm-" + m);
    }
}
function callSendAPI(sender_psid, response) {
    let request_body = {
        "recipient" : {
            "id" : sender_psid
        },
        "message" : response
    };
    request({
        "uri" : "https://graph.facebook.com/v2.6/me/messages" ,
        "qs" : { "access_token" : PAGE_ACCESS_TOKEN },
        "method" : "POST" ,
        "json" : request_body
    }, (err, res, body) => {
        if (!err) {
        } else {
            console .error( "Facebook send request failed:" + err)
        }
    });
}
function fetch(sender_psid, moment) {
    let request_body = {
        format: "FBM" ,
        "moment" : moment,
        "subscriber" : sender_psid,
        // You may pass any non-personally-identifiable information
        you have
        // about the subscriber in the targeting object.
        "targeting" : `{
            "language": "en"
        }`
    };
    const auth = __API_SECRET && {
        "user" : __API_KEY,
        "pass" : __API_SECRET,
    };

request({
        "uri" : __API_ROOT + "/fetch" ,
        "qs" : { "key" : __API_KEY },
        "method" : "POST" ,
        "json" : request_body,
        ...{auth},
    }, (err, res, body) => {
        if (err) {
            console .error( " fetch for Moment '" +
            moment + "' failed: + err);
        } else if (res && res.statusCode !==
        200 && res.statusCode !== 204 ) {
            console .error( " fetch for Moment '" +
            moment + "' failed: "
                + res.statusCode + " " + JSON .stringify(res.body));
        } else if (body && body.payload) {
            console .log( " fetch for Moment '" +
            moment + "' received payload." )
            callSendAPI(sender_psid, JSON .parse(body.payload));
        } else {
            console .log( " fetch for Moment '" +
            moment + "' was empty." )
        }
    });
}
```

Figure 10:
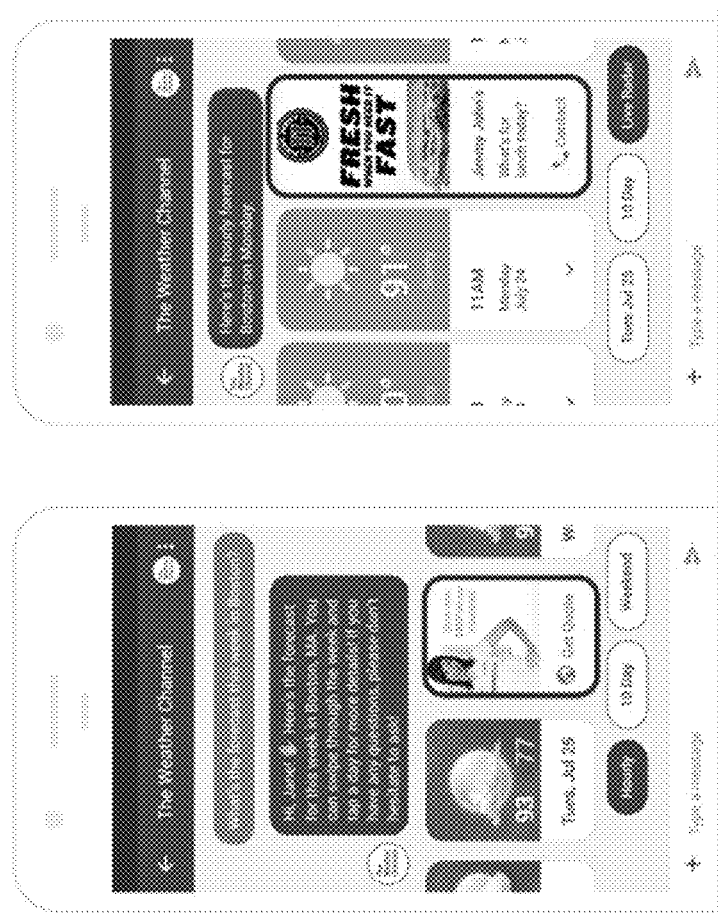
FIG. 10 is an illustrative example of an augmented message stream, according to an embodiment.

FIG. 10 is an example of an implementation of the systems and methods presented herein. In the example of FIG. 10, the highlighted cards have been inserted into the existing weather carousel for the subscriber.

Figure 11:
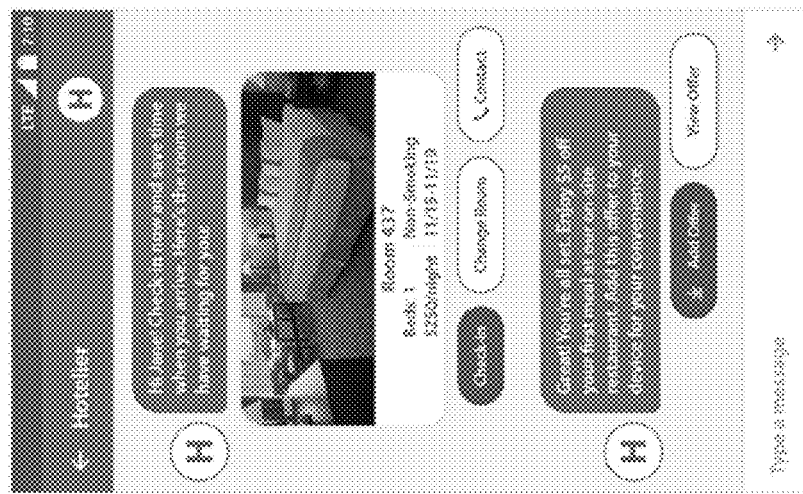
FIG. 11 is an illustrative example of an augmented message stream, according to an embodiment.

FIG. 11 is another example of an implementation of the systems and methods presented herein. In the example of FIG. 11, an offer to the subscriber is inserted into the chatbot exchange as a part of their RCS check-in notification.

FIG. 12 is yet another example of an implementation of the systems and methods presented herein. In the example of FIG. 12, the SMS subscriber experience is enhanced when the subscriber begins to run out of their mobile data quota.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for inserting interactive payloads into rich communication service (RCS) messages, the method comprising:
    receiving, by one or more processors, a RCS message and a request for augmentation of the RCS message in a message stream, the RCS message having a plurality of indexed components;
    identifying, by the one or more processors from the request, a moment derived from an interaction with the RCS message and an identification of a user associated with the interaction;
    identifying, by the one or more processors, a plurality of rules corresponding to the moment;
    filtering, by the one or more processors, the plurality of rules based on targeting parameters for the moment and user attributes associated with the user identified in the request for augmentation;
    filtering, by the one or more processors, based on the user attributes, a plurality of components associated with at least one rule of the filtered plurality of rules;
    selecting, by the one or more processors, at least one component of the filtered plurality of components and an action associated with the at least one component;
    identifying, by the one or more processors, an index in the RCS message at which to insert the at least one component and the action for the at least one component;
    modifying, by the one or more processors, the plurality of indexed components of the RCS message to include the at least one component and the action at the index; and
    transmitting, by the one or more processors, in response to the received request, the modified RCS message into the message stream, the modified RCS message including the at least one component and the action for the at least one component.

2. The method of claim 1, wherein the identification is a first identification and further comprising:
    identifying, by the one or more processors from the request, the moment derived from the interaction with the RCS message, the first identification of the user associated with the interaction, and a second identification of a format of a communication type associated with the RCS message; and
    modifying, by the one or more processors, the modified RCS message based on the second identification of the format of the communication type of the RCS message.

3. The method of claim 1, wherein the request is a first request and further comprising:
    transmitting, by the one or more processors, a second request for information regarding the user attributes identified in the first request; and
    receiving, by the one or more processors, in response to the transmitted second request, the user attributes associated with the first request.

4. The method of claim 1, further comprising retrieving, by the one or more processors, the user attributes from a memory element.

5. The method of claim 1, further comprising retrieving, by the one or more processors, the user attributes from a database.

6. The method of claim 1, further comprising loading, by the one or more processors, the plurality of rules from a database.

7. The method of claim 1, wherein identifying the rule comprises determining, by the one or more processors, based on the user attributes, the plurality of rules associated with the moment.

8. The method of claim 1, wherein filtering the plurality of components comprises:
loading, by the one or more processors, data from a cache memory; and
filtering, by the one or more processors, based on the loaded data, the plurality of components associated with at least one rule of the filtered plurality of rules.

9. The method of claim 1, wherein transmitting the RCS message comprises transmitting, by the one or more processors, the RCS message to the user, the RCS message including the at least one component and a specification of a format of the at least one component and the action for the at least one component.

10. The method of claim 1, further comprising determining, by the one or more processors, an identifier for a media file to be included in the RCS message.

11. The method of claim 10, further comprising creating, by the one or more processors, an alternate identifier for the media file to be included in the RCS message.

12. The method of claim 11, wherein transmitting the RCS message comprises transmitting, by the one or more processors, the RCS message, the RCS message including the at least one component and the alternate identifier for the media file to be included in the RCS message.

13. The method of claim 10, wherein transmitting the RCS message comprises transmitting, by the one or more processors, the RCS message, the RCS message including the at least one component, the action for the at least one component, and the identifier for the media file to be included in the RCS message.

14. The method of claim 1 wherein transmitting the RCS message comprises transmitting, by the one or more processors, the RCS message to the user, the RCS message including the at least one component, the action for the at least one component, and the user attributes.

15. A system for inserting interactive payloads into rich communication service (RCS) messages, the system comprising:
one or more processors coupled to memory, the one or more processors configured to:
receive a RCS message and a request for augmentation of the RCS message in a message stream, the RCS message having a plurality of indexed components;
identify from the request, a moment derived from an interaction with the RCS message and an identification of a user associated with the interaction;
identify a plurality of rules corresponding to the moment;
filter the plurality of rules based on targeting parameters for the moment and user attributes associated with the user identified in the request for augmentation;
filter, based on the user attributes, a plurality of components associated with at least one rule of the filtered plurality of rules;
select at least one component of the filtered plurality of components and an action associated with the at least one component;
identify an index in the RCS message at which to insert the at least one component and the action for the at least one component;
modify the plurality of indexed components of the RCS message to include the at least one component and the action at the index; and
transmit, in response to the received request, the modified RCS message into the message stream, the modified RCS message including the at least one component and the action for the at least one component.

16. The system of claim 15, wherein the identification is a first identification and wherein the one or more processors are further configured to:
identify from the request, the moment derived from the interaction with the RCS message, the first identification of the user associated with the interaction, and a second identification of a format of a communication type associated with the RCS message; and
modify the modified RCS message based on the second identification of the format of the communication type of the RCS message.

17. The system of claim 15, wherein the request is a first request and wherein the one or more processors are further configured to:
transmit a second request for information regarding the user attributes identified in the first request; and
receive, in response to the transmitted second request, the user attributes associated with the first request.

18. The system of claim 15, wherein the one or more processors are further configured to retrieve the user attributes from a memory element.

19. The system of claim 15, wherein the one or more processors are further configured to load the plurality of rules from a database.

20. The system of claim 15, wherein the one or more processors are further configured to transmit a specification of a format of the at least one component and the action for the at least one component.

* * * * *